United States Patent [19]

Lee et al.

[11] B 3,948,823

[45] Apr. 6, 1976

[54] METHOD OF MAKING PERMSELECTIVE INTERPOLYMER MEMBRANES

[75] Inventors: Lester T. C. Lee, Parsippany; Kang-Jen Liu, Somerville, both of N.J.

[73] Assignee: Allied Chemical Corporation, New York, N.Y.

[22] Filed: Aug. 1, 1972

[21] Appl. No.: 276,993

[44] Published under the Trial Voluntary Protest Program on January 28, 1975 as document no. B 276,993.

[52] U.S. Cl.. 260/2.5 M; 210/500 M; 260/30.8 DS; 260/32.6 N; 260/32.6 R; 260/32.6 PQ; 260/47 CP; 260/78 SC; 260/78 TF; 260/830 P; 260/857 L; 260/857 R
[51] Int. Cl.² ............................................ C08J 9/00
[58] Field of Search ..................... 260/2.5 M, 78 TF

[56] References Cited
UNITED STATES PATENTS

| | | | |
|---|---|---|---|
| 3,719,640 | 3/1973 | Lee et al. | 260/78 TF |
| 3,728,348 | 4/1973 | Lee et al. | 260/78 TF |

*Primary Examiner*—Morton Foelak
*Attorney, Agent, or Firm*—Arthur J. Plantamura

[57] ABSTRACT

Novel cross-linked interpolymer membranes of substantially improved efficiency and durability are prepared from a co-mixture of a hydrophilic polymer of [1, ω-alkylene(2,6-diketopiperazine)-1,4-dicarboxamide] and a hydrophobic polymer such as polyvinylidene fluoride, by dissolving these polymers in a suitable solvent, forming films of suitable thickness from the solution and thereafter preferably cross-linking the dissolved mixture.

9 Claims, 3 Drawing Figures

METHOD OF MAKING PERMSELECTIVE INTERPOLYMER MEMBRANES

BACKGROUND OF THE INVENTION

The present invention is directed to the preparation of a class of interpolymer membranes based on the hydrophilic polyamideimide of [1,ω-alkylene(2,6-diketopiperazine)1,4-dicarboxamide] (hereafter sometimes referred to as ADD). The membranes (by empolying modifications of composition and procedure) are applicable as selective membranes for dialysis and solvent extraction processes, as membranes in reverse osmosis processes, as ultrafiltration membranes in pressure-drive processes and in hollow fibers structures.

The conventional solvent-type reverse osmosis membranes require a substantial hydrostatic pressure be applied to the solution to be purified on the side of the membranes that contains the solvent or the desired component through the membrane leaving the undesirable component or solute behind because the membrane is relatively impermeable to the undesirable solute. Reverse osmosis processes require very high pressures, for examples, pressures of about 600 to 1,000 psi above the reversible osmotic pressures are commonly employed. Additionally, reverse osmosis membranes have comparatively limited applications because they are relatively nonselective and customarily permeable only to the solvent, e.g., water. Accordingly, reverse osmosis membranes are not ordinarily especially useful in separating the dissolved components of a solution as is often required in the treatment of mixtures. Further, when used to treat solutions containing high molecular weight material such as proteins or dissolved organic matter, they tend to get clogged or readily poisoned as the organic matter is selectively absorbed by the membrane. Organic matter can either coat the surface or make it hydrophobic and thereby prevent the transport of water across it. Specifically, as in desalination and other water renovation processes, the organic matter can penetrate the membrane, disrupt the hydrogen-bonded water structure, which is apparently responsible for the selective action of the membranes, and thereby destroy either the selective action of the membrane or its high flux rate, or both.

Ultrafiltration membranes capable of separating dissolved solutes of molecular weights ranging from those of the common salts to proteins have been made in the past by mixtures of polyelectrolytes held together by purely ionic bonds as complexes of polyacids and polybases, deposited upon a hydrophobic, porous matrix, or they are porous films of largely hydrophobic polymers usually formed by coagulation techniques. These polymer complexes have the disadvantages of chemically not being crosslinked, and consequently are relatively unstable and more susceptible to fouling.

The purpose of the present invention is directed to novel formulations and methods for preparing membranes which are useful for a variety of applications. For example, when used as ultrafiltration media, the membranes of the present invention may be used to separate dissolved materials using a variant of the more familiar reverse osmosis process. Additionally, the membranes of the present invention may be used in separation processes involving passive diffusion of materials across the membrane by virtue of concentration gradients in passive dialysis. Moreover, these membranes are especially useful for 2-phase solvent-extraction processes.

As contrasted with cast membranes of ionic character, as described in the prior art, the novel membranes of the invention are chemically crosslinked by covalent bonds to the degree heretofore not attainable, so they retain their particularly desirable properties for prolonged periods of time, such corsslinking having been achieved from a membrane cast from a solution whose homogeneity was maintained over a wide range of compositions.

SUMMARY OF THE INVENTION

In accordance with the present invention, we have found that substantially improved interpolymer membranes of excellent strength and controllable degree of swollen character may be formed by preparing a mixture either by way of a solution or a melt blend of two polymers comprising: (a) a highly hydrophilic ADD polyamideimide and (b) a relatively hydrophobic matrix polymer, forming a film from the mixture and upon attaining proper porosity in the film, crosslinking the mixture to form a stable membrane. When the membrane is derived by casting a film from solution, the cast film is dried to an extent sufficient to remove solvent until the desired pore size is attained and then crosslinked to produce a membrane which has essentially a fixed swollen capacity. Crosslinking may be attained either by incorporating a suitable crosslinking agent or by subjecting the film cast from solution or extruded from a melt to a condition such as radiation, which induces crosslinking. In some applications, the melt extruded membrane may be employed without crosslinking. A layered membrane may also be formed by drying and partially, or wholly, curing a first layer in the foregoing manner and thereafter casting (or extruding) a superimposed layer, or layers, in sequence and drying and crosslinking the entire layered composite.

These membranes provide very low salt-passage in spite of the fact that one component of the membrane system (i.e., ADD polymer) is known to interact strongly with certain ions and exhibit outstanding high water absorption.

DETAILED DESCRIPTION OF THE INVENTION

The present invention is directed to a novel method and to the products produced thereby for the preparation of thin, yet durable, and highly selective permeable membranes which have excellent homogeneity and high flux, i.e., they are highly permeable to water, but because of their high degree of selectivity, they have a good and variable degree of rejection of solutes of different properties and molecular weights. The process of the invention may use a variety of formulations, it being necessary only that the ADD polyamideimide polymer, the matrix polymer and the crosslinking agent be entirely soluble in a common solution prior to a casting of the film that is to comprise the membrane.

In principle, the process of the invention involves the admixture of the ADD polymer which, upon crosslinking with a matrix polymer, forms an insoluble membrane or film. An essential aspect of the invention resides in the crosslinking of the membrane formulations of this invention to prevent dissolution or swelling of the membrane when the membrane in its subsequent application may be used in solvents, particularly water. Insolubilization may be attained by the addition to the ADD polymer and the matrix polymer of a crosslinking agent which has a moderate molecular weight and which itself is entwined with the two polymers, insolubilizing it to produce a cage polymer with the ADD polymer within the crosslinked cage. Alternately, the crosslinked groups may be a part of either the ADD polymer or the matrix polymer reacting with one another. Further, in some formulations a chemical crosslinking reaction can take place between the crosslinking agent and either the ADD polymer or the matrix polymer, or a source of radiation such as actinic light may be employed to crosslink the film. The film comprising the membrane may be cast from solutions or extruded from a melt of the two polymers. The solution or melt optionally may contain a crosslinking agent. The film when crosslinked yields a high flexible film which has a high selectivity because it cannot swell excessively in aqueous solution, and thereby, when functioning as a membrane, maintains its stability for long periods of time.

When the mechanism by which the component elements of the ADD polymer, the matrix polymer and the crosslinking agents are formed by casting from a single solution, relatively thin membranes may be readily formed while at the same time affording excellent macroscopic homogeneity in the membranes which are characterized by having a high solvent permeability and a high degree of salt and/or other solute rejection. Further, the technique of preparing these membranes is such that they may be cast on either belts or other kinds of continuous equipment to form an unsupported film or they may be cast onto a supporting matrix such as a porous polymer film or a supporting film of cellulose derivative in the form of a porous film. Alternately, these membranes may be extruded similarly from a melt blend of the polymers.

The nature of the casting procedures, wherein a single solution is used containing all of the requisite components of the film, permits the formation of membranes which are extremely thin but still coherent and have substantial mechanical strength.

Because films of the compositions of the invention can be cast in a thickness of one micron or even lower, it is possible to cast these membranes in several alternating layers and still achieve a high hydraulic permeability for the system while maintaining a very high ionic rejection.

Another considerable advantage to these systems is that the casting or extruding procedures are simple and inexpensive because a thin film or layer is laid down and then allowed to dry. In the casting process, such films are merely cast from solution or the film is extruded to form a single- or multiple-layered membrane from a melt of the polymer mixture. The thickness of the active layer is controlled simply by the amount of polymer applied, which means, of course, in the case of cast films by the amount of polymer concentration in the solvent.

The porosity of these membranes can be controlled in a number of ways. One of these is to employ ADD polymers and film-forming matrix polymers which are reasonably uniform in cross-sectional diameter, i.e., they do not have large rings or other substituents in side groups, thus making them capable of coming closer together in the final film and thereby making the pores in the film smaller. For example, for a very fine pore permeable structure, one would employ the ADD polymer together with a film-forming polymer such as polyvinyl chloride-acrylonitrile copolymer or polyvinylidine fluoride, employing, for example, an epoxide as crosslinking agent. In systems of this kind, also, avoidance of the bulky benzene ring is achieved and there is less tendency to fouling in such membranes because of the absence of the aromatic structure.

As matrix polymers employed in forming the membranes using the process of the invention, any of a wide variety of polymers which are compatible with and are capable of dissolution in the same solvent with, or may form a common solution with, the ADD polymer and with the crosslinking agent, when crosslinking agents are incorporated, may be used. It is not necessary that each of the matrix polymer, the ADD polymer and the crosslinking agent be soluble in the same solvent. For example, it is sufficient if each of these components being soluble in different solvents the solutions thereof are then miscible to form a common solution. When the polymer mixture is extruded from a melt of the polymer mixture the polymers should be compatible, i.e., they should be at least partially soluble in each other so that no phase separation results in the extruded film.

Suitable matrix polymers include, for example, hydrophobic polymers and copolymers of the type which are readily available and which may be dissolved and suitably cast on a substrate to be thereafter separated, and may be self-sustaining or retained as a composite with the substrate. Illustrative of such polymeric matrix materials are polyacrylonitrile, polymerized esters of acrylic and methacrylic acid, polyvinylchloride, polyvinylfluoride, polyvinylidine chloride, polyvinylidine fluoride, polyvinyl butyral, polystyrene, polyarylmethyl styrene, polycarbonate, polymethyl methacrylate, polyolefins, polyamides, e.g., nylon6 and nylon66, polyesters, e.g., polyethylene-terephthalate, polyarylsulfones, polyphenylenesulfides, polyphenyl ethers, and the like.

Among the various ADD polymers that may be employed are those represented by the formulae (I) and (II) below. The compound may be prepared from either of the following methods: The ADD polyamide imides are prepared by reacting an equal molar ratio of nitrilotriacetic acid (NTA), i.e., $N \, \text{\textlparen}CH_2COOH\text{\textrparen}_3$ and a diamine, e.g., $H_2N-R-NH_2$ in a suitable solvent such as dimethyl formamide and thermally polymerizing the resulting salt; to yield polymers which have the following recurring formula:

(I)

wherein $R_1$ and $R_2$ have the values given below in connection with formula II.

These polymers are described in greater detail in a copending application Ser. No. 164,933, filed on July 21, 1971 now U.S. pat. No. 3,719,640.

Alternatively, ADD polyamide-imides may be employed of the kind having structure as shown in the following recurring formula:

Polymers of this kind are obtained by reacting two moles of NTA with one mole of diamine in solution such as diamethyl acetamide to form a diacid. The diacid is then reacted with another mole of diamine either in solution or by thermally polymerizing the salt to form an orderly ADD polymer, e. g. as follows:

These polymers of formula II are described in greater detail in a copending application Ser. No. 39,510 filed on May 21, 1970 now U.S. Pat. No. 3,728,348.

In the formulae I and II, $R_1$ and $R_3$ are substituents selected from the group consisting of phenylene radicals and alkylene radicals having 1 to 12 carbon atoms and $R_2$, $R_4$ and $R_5$ are substituents selected from the group of aliphatic or aromatic diradicals having 1–12 carbon atoms and include radicals which contain oxygen, sulfur and nitrogen atoms in the radical.

The membranes prepared according to the teachings of this invention have a most advantageous additional attribute in that they are nonfouling. Membrane fouling is one of the critical problem areas in membrane technology. Many classes of dissolved or suspended species become absorbed or dissolve in membranes lowering their permeability, reducing their selectivity, and interferring with their functionality. This is true of most of the known membrane systems and applied particularly to films having fixed positive charges (whether alone or combined with fixed negative charges) and to the relatively uncharged membranes.

We have found that the membranes having compositions in accordance with the invention not only do not become fouled in use but also are most valuable as a means for the pretreatment of waste or process streams prior to other treatment processes.

An essential feature in the make up of the membranes of the invention involves the crosslinking of the membrane composition. By appreciable insolubilization of i.e., film, e.e., by crosslinking, to a suitable degree, so that the membrane retains a desirable range of water contents, a novel class of highly effective and durable membranes may be prepared. As is evident from the examples given, the general course of action of the crosslinking agent may vary with the nature of the crosslinking agent and that of the other components of the casting solution. The use of a relatively substantial degree of crosslinking allows one to incorporate relatively large amounts of hydrophilic polymer in the formulation resulting in membranes of higher permeability, high selectivity and lower resistance——all important characteristics for these systems. Moreover, the condition of relatively high crosslinking even permits the use in appropriate situations of an excess of the ADD polymer over that of the matrix polymer; this disproportion would not be possible where only a small amount of crosslinking occurs because the membrane would swell to the point of partial dissolution and ineffectiveness when placed in water.

Any of various crosslinking agents known to those skilled in the art and which are compatible in the casting solution and which may be suitably activated at the proper stage of porosity of the membrane being synthesized, i.e., during the drying of the cast film, may be used. Such crosslinking agents may be used singly or in a combination of two or more. As such, any of various epoxides, amines or aldehydes, or complexes thereof having the requisite characteristics, for example, may be used, e.g., epichlorohydrin, boron trifluoridemonoethanolamine complex, epoxide-novolac, polyvinylmethylethermaleic anhydride, the epoxide of bisphenol A, butadiene diepoxide, polystyrene maleic anhydride, formaldehyde, formaldehyde solution with acid or base catalyst phenol, formaldehyde prepolymers and the like. Additionally, crosslinking may be effected using gas or solution phase treatment with diisocyanate compounds or formaldehyde compounds.

The ADD polymer and the film-forming matrix polymer generally will be of a nature such that it may be necessary or preferable to employ a cosolvent system to uniformly dissolve both of the ingredients. However, in some instances, it has been found that a single solvent is all that is necessary to form suitable membranes. The solvent system must be such that films are producible therefrom and should dissolve substantially all of the ADD polymer, the matrix polymer, and when present, the crosslinking agent.

Various solvents may be used and give satisfactory results depending on the specific ADD polymer, matrix polymer and crosslinking agent, solvents which may be employed in practicing the invention include dimethylformamide (DMF), hexamethylphosphorictriamide (HMP), dimethylacetamide, N,N-dimethylacetamide and N,N,N'N'-tetramethyoxyamide may be used. Suitable solvents specific to the ADD polymer may be drawn from a wide variety of materials, particularly good results being obtainable by using cosolvent blend of 4 to 12 parts of hexamethylphosphorictriamide per part of dimethyl formamide. A cosolvent system may be used which combines a solvent for the film-forming matrix material with one for the ADD polymer. A system of this kind may empoly, for example, various ratios of dimethylformamide and dimethyl sulfoxide.

In some cases such as with dimethylformamide, it is not necessary to use an additional solvent for the ADD polymer. However, the two-solvent system is preferred due to the fact that the films thus formed often have improved mechanical strength than those produced from a single-solvent system.

In forming the solutions of the plastic film-forming material and the ADD polymer, care may be necessary in proportioning the solvents where such solvents are mutually exclusive in their polar and nonpolar characteristics. For example, where the ADD polymer is soluble in polar solvents as DMF and HMP the correct proportions should be determined by experimentation, otherwise the ADD polymer may be coagulated from the solution, thus making it difficult to cast a film containing this material.

After the plastic film-forming material, the crosslinking agent and the ADD polymer have been suitably dissolved in a given solvent or solvent system, they are then formed by any suitable mechanical means into thin films. The formation of the membranes of the present invention is based upon the evaporation of the solvent leaving a film cast upon a suitable surface or mold. The solutions may be passed through a long slot onto a rotating drum whereby a film forms on the drum and is dried. The film is subsequently peeled off. The material may be poured on a continuous moving belt that has provision for controlled heat which will allow the film to dry.

The porosity of these membranes, as reflected by their water content and abilities to reject salts (fine pores), dyes (medium pores) and proteins (large pores) is controlled in large part by three factors: the percent crosslinking agent present, the ratio of ADD polymer to matrix polymer and the method of drying and cure. The role of crosslinking function has been detailed earlier; however, it should be noted that the crosslinking reaction is not fully effective unless the crosslinking takes place when most of the casting solvent has been evaporated and the film is fairly dry. At this point the crosslinking reaction insolubilizes the whole network and results in a pore structure of desired porosity and strength. However, if the same film is crosslinked while still swollen with casting solvent and relatively large pores are still present, insolubilization acts to stabilize these large pores in the final membrane structure. Also, when the polymer chains are not in close proximity to one another and properly intertwined, the ADD polymer is not properly insolubilized and consequently an undesirable loss of some of this key component occurs.

While there are no absolutes or standard tests which can be used to define the average pore diameter of fine-pore membranes, it may be estimated that those membranes showing salt rejections in the range of 70 percent or greater have pore diameters of about 10–12 Angstrom units, or less; those that show dye rejections, as defined herein, in the range of 30 percent or greater have pores of about 13–16 Angstrom units, or less; and those that show protein rejections, as defined herein, of greater than 97 percent have pores of diameter of about 35 Angstrom units or less. Membranes for solvent-extraction have pores of about 500A.

The following general procedure was employed in casting from nonaqueous solvents, all materials were as dry as could be obtained by dring at 40°C. over $P_2O_5$ to reasonably constant weight; polymer solutions were filtered prior to use. Films were cast on clean surfaces such as glass, glass coated with a dilute carboxymethyl cellulose solution and dried prior to use, stainless steel belts, thin plastic sheets attached to a glass surface, on paper substrates or on hollow fibers or tubes by drawing them through the casting solution. Other surfaces may also be used. The casting technique usually employs a knife blade, although the membranes may be prepared by dipping or spray techniques. After thermal or other treatment, the films may be removed from the casting surface by soaking in water, except of course when films are bonded to porous supports or to (treated) papers and are intended as an integral part of such composites. Since these formulations employ crosslinking agents prior to casting, appropriate precautions are taken to combine reactive ingredients shortly before the casting procedure itself.

Characterization Procedures. Membranes were characterized by a number of conventional evaluation procedures. These included:

Thickness (L) in microns measured using a thickness gauge with the water-wet membrane;

Water content (W) in percent as grams of water per gram of water-wet membrane;

Hydraulic permeability (HP) in cm/sec.atm. was determined in water or a dilute salt solution under the imposition of a pressure of 100–1,500 psi;

Salt rejection (S.R.) in percent was measured using a 0.01 M sodium chloride solution measured at 25°C. and employing a designated driving pressure (e.g., 600 psi) and reported as the concentration of the feed solution minus that of the product, the whole divided by the feed concentration and multiplied by 100;

Dye rejection (D.R.) in percent was measured using a 200 ppm solution of methyl violet, a cationic dye of molecular weight 393.5, measurements being made under the general conditions employed for salt rejection and reported in the same manner;

Protein rejection (P.R.) in percent was measured using a 60 ppm solution of bovine serum albumin in a pH 7.4 phosphate buffer employing the general conditions of other rejection measurements.

In addition to casting membranes by drying them on a suitable surface, they may also be prepared by drying on a rotating drum. This latter procedure is substantially as follows: The membranes were cast on a highly polished chromium-plated drum. This drum was rotated on its axis in a horizontal position with an adjustable speed motor and gear assembly. A 250-watt infrared bulb is placed above the drum so that the temperature of the drum could be maintained at the desired value. When the temperature of the drum attains equilibrium, a pan of casting solution is placed under the drum so it extends into the solution approximately one-half inches. The drum is rotated in this casting solution for a period of time and the pan is removed. Rotation is continued until the membrane dries and is removed by rotating in a pan of deionized water. Multilayer films may be cast on the rotating cylinder by allowing the previously cast film to set before applying another coating. Other methods for casting the films other than by the techniques described may also be used with equal effectiveness. Also, films may be formed by building up several thin films by known multiple casting techniques whereby films of varying thicknesses may be prepared.

A feature of the present invention resides in casting solutions by spraying upon porous surfaces which act as bases, supports or frameworks to strengthen the films and make them more adaptable for use in electromechanical apparatus. In this particular adaptation, extremely thin films may be placed on rigid, porous backing members either by spraying or casting technique using dilute solutions. The porous backing members may be of any suitable material usually nonconductive, plastic screens; porous ceramic materials; insulated metal screens, and the like are suitable.

The evaporation of the solvent from the casting solution may be accomplished at room temperature or the temperature may be above room temperature, but in no event should the heat applied exceed the decomposition point of the ingredients of the membrane.

The thickness of these films may be readily controlled by the amount of plastic film-forming material and ADD content contained in the solvent or solvent system used to prepare the casting media or by controlling the thickness of the film cast.

As the drying progresses, the amount of solvent contained in the plastic film-forming material tends to be driven from the pores, and a mechanical tightening or contraction of the film surface tends to take place. At the end of a longer period, e.g., a 3-hour period, the pore areas become relatively fixed and more contracted than in the case of a shorter period of drying, e.g., 0.5 hour. Other conditions of time and temperature give corresponding results. At this stage, i.e., when the drying is advanced substantially, the films may be insolubilized by activating the crosslinking agent. In preparing membranes from a melt of the component polymers, control of the water absorption characteristics of the membrane is effected by varying the proportion of the ADD polymer.

Useful membranes may also be prepared by spinning hollow fibers from the casting solutions described in this invention with suitable modifications of procedures applied in spinning processes such as by employing a higher solids content and/or a higher temperature of spinning. Additionally, membranes can be made by casting these formulations onto a preformed hollow fiber or tube of suitable dimensions such as by drawing the tube through the solution followed by drying and crosslinking of the solution.

The following examples are provided to more fully illustrate the invention. It will be understood that, because the examples are illustrative, they are not to be construed as limiting the invention, except as defined by the appended claims. All parts are parts by weight, except where otherwise expressly stated.

EXAMPLE 1

A solution was prepared by dissolving 68.0 parts of poly-[hexamethylene(2,6-diketopiperazine)1,4-dicarboxamide] (HDD) and 22.6 parts of polyvinylidine fluoride in 22.0 parts of hexamethylphosphoric triamide (HMP) and 2.50 parts of dimethylformamide (DMF). This clear, homogeneous solution was then filtered to remove dust particles through a sintered glass filter. Shortly before membrane casting, 9.4 parts of crosslinking agent consisting of 1 part $BF_3$-MEA (a complex of boron trifluoride and monoethanol amine) and 5 parts of epoxide-novolac, was added to the solution. The solution was vigorously agitated for 10 minutes, then transferred to a centrifuge tube which was placed in a centrifuge for 5 minutes to remove the air bubbles. The clear solution was immediately cast on the glass plate with a Gardner Knife set at a suitable gate.

The membrane so cast was placed level into an oven at 120°C. for 1 hour and then cured for 3 hours at 150°C. The membranes were cooled to room temperature and then immersed in water to separate them from the glass surface. The membrane was ready for testing after 48 hours immersing in water.

The membrane so obtained has a thickness of $22.5\mu$, a water absorption of 28.9 percent. The salt rejection was measured using a 0.01 M sodium chloride solution employing a reverse osmosis apparatus at 25°C. and 900 psi pressure. The sample collected was titrated by the standard silver nitrate method. The result indicated 99 percent salt rejection. The flux rate is 5.8 gal/sq. ft./day/micron.

EXAMPLE 2

The procedure of Example 1 was followed, except that the casting glass surface was pretreated with 1.0 percent carboxymethyl cellulose. The obtained membrane has a thickness of $11.8\mu$ and a water absorption of 26.5 percent. The salt rejection of 0.01 M NaCl at 25°C. and 600 psi is higher than 98 percent. The flux rate is 13.8 gal/ft²/day/micron.

EXAMPLE 3

The procedure of Example 1 was followed except that 76.5 parts of HDD, 14.5 parts of polyvinylidene fluoride, and 9.0 parts of Epoxy-Novolac was used. The obtained membrane has a thickness of $12.75\mu$ and a water absorption of 38.5 percent. The salt rejection of 0.01 M NaCl solution at 25°C. and 600 psi is higher than 95.0 percent with a flux rate of 12.5 gal/ft²/day/micron.

EXAMPLE 4

The procedure of Example 1 was followed except that 68 parts HDD, 22.8 parts of polyvinylbutyral and 9.2 parts Epoxy-Novolac was used. The solvent used for casting film is 90 percent hexamethylphosphoramide and 10 percent dimethylformamide for a 10 percent solid solution.

The membrane obtained has a thickness of $14.2\mu$ and a water absorption of 30.3 percent. The salt rejection of 0.10 M NaCl solution is higher than 98 percent with a flux rate of 17.1 gal/ft²/micron.

EXAMPLE 5

The same membrane was prepared as following Example 4. Afterward, the dried membrane was treated with tolylene-2,4-diisocyanates gas vapor for 2 minutes for crosslinking the HDD polymer. The salt rejection of 0.10 M NaCl solution is 99 percent with a flux rate of 4.7 gal/ft²/day/micron.

EXAMPLE 6

In this run, a cellulose sheet is employed as the backbone of the membrane. The cellulose sheet is impregnated with a 20 percent solution consisting of 76.5 parts of HDD, 14.5 parts of polyvinylidene fluoride and 9.0 parts of Epoxy-Novolac resin in hexamethylphosphoroamide and dimethylformamide in a ratio of 9:1. The excess solution was removed by pulling the strip through two parallel round glass rods. The sheets then hung in the air in an air circulating oven to cure at 120°C. for 1 hour and at 150°C. for 3 hours. The sheets were soaked in water for at least 48 hours before testing.

The membrane sheet has a thickness of 13.8μ and has a water content of 28.5 percent. The salt rejection of 0.01 M NaCl solution is higher than 97.5 at 600 psi and 25°C., the flux rate is 40.3 gal/ft²/day/micron.

The Dye Rejection in Percent was measured using a 200 ppm solution of methyl violet ($C_{24}H_{28}ClN_3$) with a molecular weight of 393.5. The measurement being made under the general conditions employed for salt rejection at 600 psi pressure and 25°C., the membrane shows 100 percent dye rejection.

The membrane showed a 100 percent protein rejection which was measured using a 60 ppm solution of albumin bovine in a pH 7.2 phosphate buffer employing the general conditions of salt rejection measurements.

EXAMPLE 7

Same procedure of Example 6 is followed except that two cellulose sheets were impregnated and cured together as one single membrane. The membrane obtained has a thickness of 18.8μ and a water content of 28.0 percent. The salt rejection measured at 600 psi and 25°C. on 0.01 M NaCl was higher than 97.5 percent. The measured flux rate is 40.3 gal/ft²/day/micron.

EXAMPLE 8

This membrane was prepared for the purpose of using for solvent extraction. A 10 percent solution by weight was prepared by dissolving 20 parts of poly[-Bis(3-propylene)methylamine(2,6-diketopiperazine)1,4-dicarboxamide] and 80 parts of polycaprolactam in 2,2,2,-trifluoroethanol. This clear, homogeneous solution was then filtered and centrifuged. The clear solution was immediately cast on the glass plate with a Gardner Knife set in a suitable gate. The membrane so cast was slowly dried at room temperature and easily separated from the glass surface.

Figure 1:
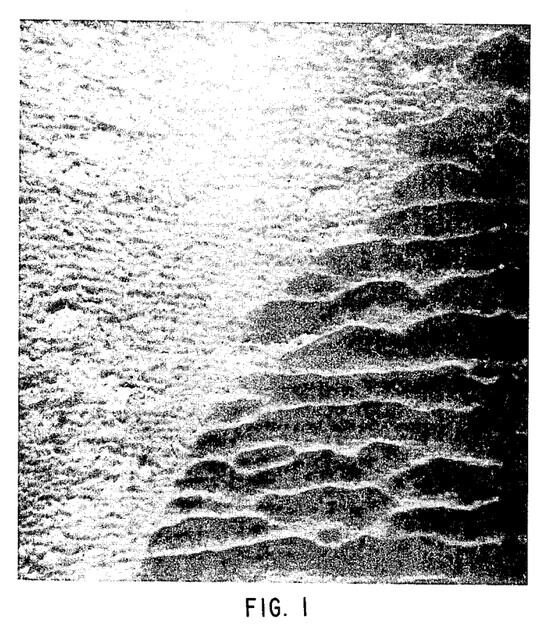
FIG. 1 is a photomicrograph of the cross section of an illustrative membrane prepared according to the invention magnified 5,000 times.
Figure 2:
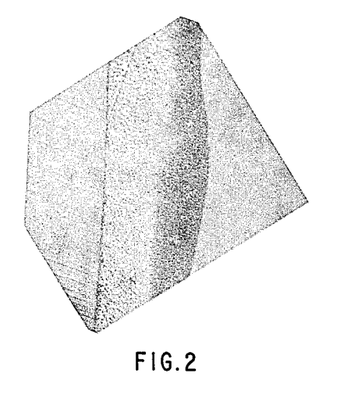
FIG. 2 is a photomicrograph of the cross section of FIG. 1 magnified 175 times.
Figure 3:
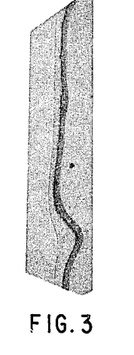
FIG. 3 is a photomicrograph in which the cross section of the membrane of FIG. 1 is enlarged to a magnification of 22 times.

The membrane so obtained has a thickness of 4.2 mils and a water absorption of 29.2 percent. The morphology of the membrane was examined with the optical and the transmission electron microscope. The membrane consisted essentially of two layers, the cross section of this membrane is shown in FIGS. I and II. The FIG. III shows the detailed morphology of the membrane. The layer A was characterized by the presence of ADD domains (~350A) finely dispersed in a less electrondense matrix. The adjoining matrix layer B was characterized by the presence of large islands or agglomerates of electrondense matter which were separated by channels of materials. It is seen that the matrix phase permits very high flux while affording strong mechanical support. On the other hand, the ADD phase affords good permselectivity without substantially restricting the flux rate.

The membrane was placed between two solutions, one is chloroform and the other a 30 percent caprolactam aqueous solution. The caprolactam was effectively extracted through the membrane into the organic layer. The diffusivity was found to be 8.83 × 10⁻⁷ cm²/sec.

EXAMPLE 9

To 50 parts of dry poly[hexamethylene(2,6-diketopiperazine)-1,4-dicarboxamide] (30 mesh powder) is added 190 parts of polycaprolactam (Plaskon brand of Allied Chemical Corporation) also 30 mesh and in dry powder form. The two polymers were mixed well and then immediately belnded in a CWB extruder at 235°C with resonance time of 3.0 minutes. The blended extruded rod was then cut into granular form by a Wiley Mill Cutter. After vacuum drying at 80°C. overnight, the blend was fed into a Ram Extruder heated at 245°C. After 6 minutes, a film balloon was produced by blowing the extruded melt with hot nitrogen gas. The film balloon extruded from the melt was then cut into flat membranes. These membranes may be used with or without crosslinking. In order to crosslink the membrane, it is passed through a chamber filled with tolylene-2,4-diisocyanate gas for a retention period of two minutes to produce a fully crosslinked product.

The non-crosslinked membrane was employed in solvent extraction as follows: The non-crosslinked membrane was immersed in water for 48 hours. The 7.0 mil thick circular membrane 20.8 cm² in size was placed betweeen two solutions. The solution on one side is 300 ml of water containing 20 percent caprolactam; the other side is 300 ml of chloroform. After 8 hours, 1.02 gram caprolactam was obtained in the chloroform phase; the diffsuivity is calculated to be 6.4 × 10⁻⁹ cm²/sec.

The foregoing is illustrative of a wide range of variability and range of useful properties that can be attained by an application of the teachings of this invention. In the treatment of process streams and in control of pollution, it may frequently be desirable to reject one class of solutes while allowing others to pass through; the teaching herein provided allows one to tailor-make a membrane to fit a specific application using only a single formulation or a limited set of formulations.

The membranes of the invention have a varied field of utility. For example, they are useful in removing dyes or solid particles such as salt or proteins from liquid dispersions. Other applications include concentrating dilute salt solutions, e.g., radioactive waste waters; neutral salts such as sodium sulfate.

It will be apparent that other variations may be made by one skilled in the art without departing from the invention claimed.

What is claimed is:

1. A process for the manufacture of a substantially macroscopically homogeneous membrane comprising forming a common solution of (a) from about 5 to about 80 percent of a matrix polymer; (b) from about 5 to about 95 percent of poly[1,ω-alkylene (2,6-diketopiperazine)1,4-dicarboxamide] selected from the group consisting of those having the formulae:

and wherein $R_1$ and $R_3$ are substituents selected from the group consisting of phenylene radicals and alkylene radicals having 1 to 12 carbon atoms and $R_2$, $R_4$ and $R_5$ are substituents selected from the group consisting of aliphatic and aromatic diradicals having 1 to 12 carbon atoms and may include oxygen, sulfur, and nitrogen atoms, wherein said matrix polymer (a) is compatible with the polymer (b), and wherein the ratio of (a) to (b) produces a membrane with a water content of from about 15 percent to about 75 percent, forming a membrane of a desired thickness, and crosslinking the membrane to convert it into an insoluble membrane of predetermined porosity.

2. The process of claim 1 wherein said polymers (a) and (b) are dissolved to form a common solution and thereafter casting a film of desired thickness and prior to crosslinking said film, drying said film until a desired porosity is attained.

3. The process of claim 1 wherein said membrane is formed from a solution of polymers (a) and (b) in which a chemical crosslinking agent has been incorporated and drying said membrane below the active temperature of the crosslinking agent until at least about 90 percent of the solvent is removed.

4. The process of claim 2 wherein the matrix polymer is present in amounts of from about 5 to about 80 percent, the 1,ω-alkylene(2,6-diketopiperazine)1,4-dicarboxamide polymer (b) in amounts from about 5 to about 95 percent and a chemical crosslinking agent (c) is present in amounts of at least 0.5 percent.

5. The process of claim 1 wherein the 1,ω-alkylene-(2,6-diketopiperazine)1,4-dicarboxamide polymer is wherein $R_1$ represents a phenylene radical or an alkylene radical having 1 to 12 carbon atoms and $R_2$ represents an organic radical selected from the group consisting of aliphatic and aromatic diradicals having 1 to 12 carbon atoms and diradicals of this class containing oxygen, sulfur and nitrogen atoms.

6. The process of claim 1 wherein the 1,ω-alkylene-(2,6-diketopiperazine)1,4-dicarboxamide polymer is wherein $R_3$ is a phenylene radical or an alkylene radical having 1 to 12 carbon atoms and $R_4$ and $R_5$ represent an organic radical selected from the group consisting of aliphatic and aromatic diradicals having 1 to 12 carbon atoms and diradicals of this class containing oxygen, sulfur, and nitrogen atoms.

7. A membrane comprising a homogeneous crosslinked interpolymer of (a) a matrix polymer and (b) a polymer forming a common solution with (a) and consisting essentially of a 1,ω-alkylene(2,6-diketopiperazine) 1,4-dicarboxamide polymer characterized by a hydraulic permeability of at least $10^{-5}$ cm/sec.atm., a water content of from about 15 percent to about 75 percent, and characterized by a porosity which produces a salt rejection of at least 1.0 percent at 60 psi.

8. The polymeric membrane of claim 7 wherein the 1,ω-alkylene(2,6-diketopiperazine)1,4-dicarboxamide polymer incorporated within the crosslinked network has the formula wherein $R_1$ represents a phenylene radical or an alkylene radical having 1 to 6 carbon atoms and $R_2$ represents an organic radical selected from the group consisting of aliphatic and aromatic diradicals having 1 to 12 carbon atoms and diradicals of this class containing oxygen, sulfur and nitrogen atoms.

9. The polymeric membrane of claim 7 wherein the 1,ω-alkylene(2,6-diketopiperazine)1,4-dicarboxamide polymer incorporated within the crosslinked network has the formula wherein $R_3$ is a phenylene radical or an alkylene radical having 1 to 12 carbon atoms and $R_4$ and $R_5$ represent an organic radical selected from the group consisting of aliphatic and aromatic diradicals having 1 to 12 carbon atoms and diradicals of this class containing oxygen, sulfur and nitrogen atoms.

* * * * *

UNITED STATES PATENT AND TRADEMARK OFFICE
CERTIFICATE OF CORRECTION

PATENT NO. : 3,948,823
DATED : April 6, 1976
INVENTOR(S) : Lester T. C. Lee and Kang-Jen Liu It is certified that error appears in the above-identified patent and that said Letters Patent are hereby corrected as shown below:

Column 13, claim 1, in the formula, that portion

"$N-R_3-C-NH-R_5-NH$" should be

-- $N-R_3-\overset{\overset{O}{\|}}{C}-NH-R_5-NH$ --.

Signed and Sealed this

Tenth Day of August 1976

[SEAL]

Attest:

RUTH C. MASON
*Attesting Officer*

C. MARSHALL DANN
*Commissioner of Patents and Trademarks*